United States Patent
Ichikawa et al.

(10) Patent No.: US 9,829,086 B2
(45) Date of Patent: Nov. 28, 2017

(54) PULLEY APPARATUS

(71) Applicant: NSK Ltd., Shinagawa-ku, Tokyo (JP)

(72) Inventors: Tomoya Ichikawa, Fujisawa (JP); Minoru Tahara, Fujisawa (JP)

(73) Assignee: NSK Ltd., Tokyo (JP)

( * ) Notice: Subject to any disclaimer, the term of this patent is extended or adjusted under 35 U.S.C. 154(b) by 92 days.

(21) Appl. No.: 14/991,990

(22) Filed: Jan. 10, 2016

(65) Prior Publication Data

US 2016/0201788 A1    Jul. 14, 2016

Related U.S. Application Data

(62) Division of application No. 13/696,078, filed as application No. PCT/JP2012/066430 on Jun. 27, 2012, now Pat. No. 9,273,772.

(30) Foreign Application Priority Data

Jun. 30, 2011    (JP)  ................................. 2011-145210
Apr. 25, 2012    (JP)  ................................. 2012-099430

(51) Int. Cl.
     *F16H 55/38*      (2006.01)
     *F16C 19/06*      (2006.01)
     (Continued)

(52) U.S. Cl.
     CPC ........... *F16H 55/38* (2013.01); *F16C 33/581* (2013.01); *F16C 33/583* (2013.01);
     (Continued)

(58) Field of Classification Search
     CPC .. F16H 55/38; F16H 55/48; F16H 2200/0078; F16C 33/581; F16C 33/583;
     (Continued)

(56) References Cited

U.S. PATENT DOCUMENTS 1,615,170 A    1/1927   Evans
2,241,686 A    5/1941   Ware
(Continued)

FOREIGN PATENT DOCUMENTS

JP      50-20043 U      3/1975
JP      50-23540 U      3/1975
(Continued)

*Primary Examiner* — William E Dondero
*Assistant Examiner* — Robert T Reese
(74) *Attorney, Agent, or Firm* — Shapiro, Gabor and Rosenberger, PLLC

(57) ABSTRACT

Construction is achieved by which it is possible definitely prevent the occurrence of creep between a pulley 2b and an outer ring 7f.
Trapezoidal shaped concave sections are formed such that the angle of intersection θ between the inside surfaces 23 on both sides of each concave section 17a of knurling 19a of the outer ring 7f is within the range 45°≤θ≤120°. Moreover, the depth h in the radial direction of the concave sections 17a and the diameter D of the circumscribed circle of the tip end surfaces 22 of the convex sections 18a are regulated so as to satisfy the relationship 0.004D≤h≤0.015D, and the length L in the circumferential direction of the bottom surface 21 of the concave sections 17a is regulated within the range 0.01D≤L≤0.03D.

5 Claims, 12 Drawing Sheets

(51) Int. Cl.
*F16H 55/36* (2006.01)
*F16H 55/48* (2006.01)
*F16C 33/58* (2006.01)
*F16C 35/067* (2006.01)

(52) U.S. Cl.
CPC .......... *F16C 33/586* (2013.01); *F16C 35/067* (2013.01); *F16H 55/36* (2013.01); *F16H 55/48* (2013.01); *F16C 19/06* (2013.01); *F16C 2240/42* (2013.01); *F16C 2361/63* (2013.01); *F16H 2200/0078* (2013.01)

(58) Field of Classification Search
CPC .... F16C 33/585; F16C 33/586; F16C 35/067; F16C 19/06; F16C 2240/42; F16C 2361/63
See application file for complete search history.

(56) References Cited

U.S. PATENT DOCUMENTS

| | | | |
|---|---|---|---|
| 2,262,714 A | 11/1941 | Ware | |
| 4,103,558 A | 8/1978 | Peabody | |
| 4,602,875 A * | 7/1986 | Doerr | F16C 13/006 384/477 |
| 4,610,645 A | 9/1986 | Donn | |
| 4,610,646 A | 9/1986 | Walter | |
| 4,668,209 A | 5/1987 | Kyoosei | |
| 4,925,322 A | 5/1990 | Hishida | |
| 5,630,769 A | 5/1997 | Schmidt | |
| 5,660,447 A | 8/1997 | Angelici | |
| 5,667,280 A | 9/1997 | Hansen | |
| 5,725,448 A | 3/1998 | Kato | |
| 5,931,755 A | 8/1999 | Mailey | |
| 6,142,675 A | 11/2000 | Brandenstein | |
| 6,482,140 B1 | 11/2002 | Takatsu | |
| 6,645,415 B2 | 11/2003 | Takatsu | |
| 6,860,639 B2 | 3/2005 | Tabuchi | |
| 8,911,025 B2 | 12/2014 | Rota | |
| 9,273,772 B2 * | 3/2016 | Ichikawa | F16H 55/48 |
| 2003/0168904 A1 | 9/2003 | Frigo | |
| 2004/0075331 A1 | 4/2004 | Black | |
| 2008/0179940 A1 | 7/2008 | Hill | |
| 2010/0284642 A1 * | 11/2010 | Mineno | F16C 35/067 384/569 |
| 2014/0357439 A1 * | 12/2014 | Schaefer | F16H 55/48 474/168 |

FOREIGN PATENT DOCUMENTS

| | | |
|---|---|---|
| JP | 61-038218 A | 2/1986 |
| JP | 10-122339 A | 5/1998 |
| JP | 11-148550 A | 6/1999 |
| JP | 2004-028275 A | 1/2004 |
| JP | 2008-050902 A | 3/2008 |
| JP | 2008-249131 A | 10/2008 |
| JP | 2010-084817 A | 4/2010 |

* cited by examiner

PULLEY APPARATUS

TECHNICAL FIELD

The present invention relates to a pulley apparatus such as guide pulley or tension pulley that is assembled and used in a belt power train mechanism such as a mechanism that drives an auxiliary machine like a compressor used in the air-conditioner of an automobile by way of a continuous pulley, or a mechanism that transmits rotation force between a crank pulley that is fastened to the end section of a crankshaft and a cam pulley that is fastened to the end section of a camshaft by way of a timing belt.

BACKGROUND ART

As a pulley apparatus such as a guide pulley or tension pulley that is assembled and used in a belt power train mechanism, pulley apparatuses having a synthetic resin pulley fastened to the outer ring of a rolling bearing made of a metal material such as bearing steel have been conventionally used in order to reduce weight and cost. FIG. 9 illustrates a construction of a pulley apparatus in which a synthetic resin pulley as disclosed in JP 10-122339 (A) is assembled. This pulley apparatus 1 is composed of a pulley 2 made of synthetic resin and around which a belt is placed, and a rolling bearing 3, which is a single-row deep-groove radial ball bearing for supporting the pulley 2 so as to be able to freely rotate around a support shaft or the like. The rolling bearing 3 comprises: an inner ring 5 having a single-row inner ring raceway 4 formed around the outer circumferential surface thereof; an outer ring 7 having a single-row outer ring raceway 6 formed around the inner circumferential surface thereof; and a plurality of rolling elements that are located between the inner ring raceway 4 and the outer ring raceway 6 so as to be able to roll freely. Moreover, a seal plate 9 is provided between the outer circumferential surface of both end section of the inner ring 5 and the inner circumferential surface of both end sections of the outer ring 7, and together with preventing grease that is filled in the internal space where the rolling elements 8 are located from leaking to the outside, prevents dust and the like from the outside getting into the internal space. The pulley 2 is fastened around the outer circumferential surface of the outer ring 7 of the rolling bearing 3 made in this way.

The pulley 2 has an inner-diameter side cylindrical section 10 and an outer-diameter cylindrical section 11 that are concentric with each other. The outer circumferential surface in the middle section of the inner-diameter side cylindrical section 10 and the inner circumferential surface in the middle section of the outer-diameter cylindrical section 11 are connected by a circular ring shaped connecting section 12, and a plurality of reinforcement ribs 13 are provided on each of both sides of the connecting section 12 in a radial shape. This kind of pulley 2 is such that the inner-diameter cylindrical section 10 is provided and fastened around the outer ring 7 of the rolling bearing 3 by injection molding. In other words, the pulley apparatus 1 is obtained by injecting molten thermoplastic resin inside a cavity having an inner shape that corresponds to the outer shape of the pulley 2 which is formed in a die with the portion near the outer circumference of the outer ring 7 molded on the inner circumference side thereof, and after this thermoplastic resin has cooled and solidified, opening the die and taking the pulley 2 with the rolling bearing 3 from the cavity.

The pulley apparatus 1 that is constructed in this way is used as a guide pulley or tension pulley which is assembled in belt power train mechanism that drives an auxiliary machine of an automobile. In other words, the inner ring 5 of the rolling bearing 3 is fitted and fastened onto a support shaft that is fastened to a stationary portion of the engine such as the cylinder block. A continuous belt is placed around the outer circumferential surface of the pulley 2. As this continuous belt moves, the pulley 2 rotates, and the contact angle and tension of the continuous belt is maintained.

In the case of a pulley apparatus 1 in which a synthetic resin pulley 2 is fastened to the outer circumferential surface of the outer ring 7, the outer ring 7 is made using metal plate such as bearing steel, so the coefficient of linear expansion of the outer ring 7 and the pulley 2 are different. Therefore, as the temperature rises during use, the adhesion between the outer ring 7 and the pulley 2 decreases, and there is a possibility that relative slipping (creep) will occur between the outer ring 7 and the pulley 2. Technology for preventing this kind of creep is disclosed in JP 61-38218 (A), JP 50-20043 (U), JP 50-23540 (U), and JP 11-148550 (A). In the pulley apparatus disclosed in JP 61-38218 (A), as illustrated in FIGS. 10A, 10B, knurling (serration) 14 is formed around the entire outer circumferential surface of the outer ring 7a, and when a synthetic resin pulley is fitted around the outside of the outer ring 7a, the knurling 14 bites into the inner circumferential surface of the pulley, which prevents creep.

Moreover, in the pulley apparatus disclosed in JP 50-20043 (U), as illustrated in FIGS. 11A, 11B, a concave groove 15a (15b) having differing width along the axial direction is formed in the circumferential direction in the outer circumferential surface of the outer ring 7b (7c), and a synthetic resin pulley is fastened to the outer circumferential surface of the outer ring 7b (7c) by injection molding. When performing injection molding, molten thermoplastic synthetic resin is filled into the concave groove 15a (15b). The concave groove 15a has differing width in the axial direction in the circumferential direction, so the inside surface of the concave groove 15a (15b) engages with the synthetic resin that is solidified inside the concave groove 15a (15b), which prevent the occurrence of creep between the outer ring 7b (7c) and the pulley.

Furthermore, in the pulley apparatus disclosed in JP 50-23540 (U), as illustrated in FIG. 12, a pair of concave grooves 15c are formed around the entire outer circumferential surface of the outer ring 7d so as to be inclined with respect to the axial direction and not parallel with each other, and a synthetic resin pulley is fastened on the outer circumferential surface of the outer ring 7d by injection molding. The pair of concave grooves 15c is inclined in the axial direction, so the occurrence of creep between the outer ring 7d and the pulley is prevented. In this construction, by making direction of inclination of the pair of concave grooves 15c opposite from each other, the axial loads that occur as the pulley rotates cancel each other out, and thus a moment load that causes pulley apparatus to twist does not occur in the outer ring 7d.

In the construction disclosed in JP 61-38218 (A), JP 50-20043 (U) and JP 50-23540 (U), it is possible to prevent the occurrence of creep between the pulley and the outer ring 7a to 7d, however, there is still some unsolved problems. In other words, in the case of the construction disclosed in JP 61-38218 (A), knurling 14 is formed around the entire outer circumferential surface of the outer ring 7a, so when performing heat treatment after the knurling 14 is formed, there is a possibility that the outer ring 7a may deform due to residual strain. Moreover, when forming an outer ring raceway 6 around the inner circumferential surface of the outer ring 7a, it is difficult to hold the outer circumferential surface of the outer ring 7a with good precision. Therefore, there is a possibility that the workability and processing precision of the outer ring raceway 6 will decrease.

On the other hand, in the case of the construction disclosed in JP 50-20043 (U) and JP 50-23540 (U), a cylindrical surface remains on the outer circumferential surface of the outer ring 7b to 7d, so there is no decrease in the workability or processing precision of the outer ring raceway 6. However, as the performance of automobiles has increased in recent years, there is a tendency for the tension in the belt placed around the pulley and the rotational speed of the pulley to increase, and so there is increase in the force that causes creep to occur between the pulley and the outer ring. In the case where the force that causes creep is large, in the construction disclosed in JP 50-20043 (U), it is necessary to make the difference in the width dimension in the axial direction of the concave groove 15a (15b) large, and in the construction disclosed in JP 50-23540 (U), it is necessary to make the inclination angle of the concave grooves 15c large. When the difference in the width dimension of the concave groove 15a (15b) or the inclination angle of the concave grooves 15c is large, the processing area on the outer circumferential surface of the outer ring 7b to 7d becomes large.

Furthermore, in the case of the construction disclosed in JP 50-20043 (U) and JP 50-23540 (U), the shape in the width direction of the cylindrical surface that remains on the outer circumferential surface of the outer ring 7b to 7d changes in the circumferential direction. Therefore, when performing heat treatment of the outer ring 7b to 7d after the concave grooves 15a to 15c have been formed, there is a possibility that the outer ring 7b to 7d will deform due to residual strain.

FIG. 13 and FIG. 14 illustrate construction that is disclosed in JP 11-148550 (A). In this construction, a locking groove 16 is formed in part in the axial direction of the outer circumferential surface of the outer ring 7e of the rolling bearing 3a, and a straight pattern knurling 19 is formed by arranging concave sections 17 and convex section 18 alternately around the entire circumference of the bottom surface of the locking groove 16 using knurling process. Part of the synthetic resin of the pulley 2a is allowed to enter into the concave sections 17 that are formed in the bottom surface of the locking groove 16 of the outer ring 7e to form protrusions 20 that are long in the axial direction on the inner circumferential surface of the pulley 2a. The engagement between these protrusions 20 and the knurling 19 on the outer ring 7e prevents the occurrence of creep between the pulley 2a and the outer ring 7e.

In the case of the construction disclosed in JP 11-148550 (A), the shape in the width direction of the cylindrical surface remaining on the outer circumferential surface of the outer ring 7e is the same in the circumferential direction, so even when performing heat treatment after the knurling 19 has been formed on the outer circumferential surface of the outer ring 7e, deformation of the outer ring 7e due to residual strain is prevented. However, in this construction the number, shape and dimensions of the concave sections 17 and convex sections 18 of the knurling 19 are not particularly regulated. Therefore, when the length in the circumferential direction of the bottom surface of the concave sections 17 is too short, or when the depth in the radial direction of the concave sections 17 is too deep, the part of the synthetic resin of the pulley 2a does not enter into all of the concave sections 17, so there is a possibility that gaps (voids) will occur between the inner circumferential surface of the pulley 2a and the outer circumferential surface of the outer ring 7e. Particularly, when the length in the circumferential direction of the concave sections 17 is short (essentially 0), and the cross-sectional shape of the protrusions 20 is triangular, it becomes easy of gaps to occur between the inner circumferential surface of the pulley 2a and the outer circumferential surface of the outer ring 7e. As a result, there is a possibility of looseness between the pulley 2a and the outer ring 7e, or a possibility that it will not be possible to sufficiently maintain the connecting strength between the pulley 2a and the outer ring 7e.

RELATED LITERATURE

Patent Literature

[Patent Literature 1] JP 10-122339 (A)
[Patent Literature 2] JP 61-38218 (A)
[Patent Literature 3] JP 50-20043 (U)
[Patent Literature 4] JP 50-23540 (U)
[Patent Literature 5] JP11-148550 (A)

SUMMARY OF THE INVENTION

Problem to be Solved by the Invention

In consideration of the problems above, it is the object of the present invention to provide a pulley apparatus that is able to surely prevent the occurrence of creep between a pulley made of synthetic resin and an outer ring made of a metal material.

Means for Solving the Problems

The pulley apparatus of a first aspect of the present invention comprises a pulley and a rolling bearing. The rolling bearing has an inner ring that has an inner ring raceway around the outer circumferential surface thereof, an outer ring that has an outer ring raceway around the inner circumferential surface thereof, and a plurality of rolling elements that are provided between the inner ring raceway and the outer ring raceway. The pulley has an outer circumferential surface around which a belt is placed, and an inner circumferential surface that is fitted around the outer circumferential surface of the outer ring. The present invention can be suitably applied to a pulley apparatus in which the inner ring raceway and outer ring raceway are both single-row deep-groove type, and the rolling elements are balls.

Particularly, in the pulley apparatus of this first aspect of the present invention, at least one locking groove is provided around part in the axial direction of the outer circumferential surface of the outer ring, the locking groove having a width that is within the range of $\frac{1}{20}$ to $\frac{1}{2}$ the width of the outer ring, and knurling is formed on the bottom surface of this locking groove by a knurling process such that concave sections and convex sections that extend in the width direction are alternately arranged around the entire circumference. The number, shape and the dimensions of these concave sections and convex sections are regulated so as to satisfy all of the conditions (1) to (3) below.

(1) Of these concave sections, the angle θ of intersection between the two inside surfaces that are on both sides in the circumferential direction of the bottom surface and continuous with the tip end surfaces of the adjacent convex sections is within the range 45° to 120°; these concave sections having a trapezoidal shape.

(2) The diameter D of the circumscribed circle of the tip end surface of the convex section and the length L in the circumferential direction of the bottom surface of the concave sections satisfy the relationship $0.01D \leq L \leq 0.03D$.

(3) The above diameter D and the depth h in the radial direction of the concave sections satisfy the relationship $0.004D \leq h \leq 0.015D$.

A plurality of trapezoidal shaped protrusions that extend in the width direction and that engage with the concave sections are formed around part in the axial direction of the inner circumferential surface of the pulley, so that the pulley is supported by the outer circumferential surface of the rolling bearing.

Preferably, the pulley is fastened to the outer circumferential surface of the outer ring by injection molding, and the protrusions are formed at the same time as this injection molding by molten resin of the pulley being filled in the locking groove and hardening, with these protrusions engaging with the concave sections.

Preferably, the concave sections and convex sections of the knurling are provided so as to be inclined with respect to the axial direction.

The pulley apparatus of a second aspect of the present invention also comprises: a rolling bearing having an inner ring that has an inner ring raceway around the outer circumferential surface thereof, an outer ring that has an outer ring raceway around the inner circumferential surface thereof, and a plurality of rolling elements that are provided between the inner ring raceway and the outer ring raceway; and a pulley that has an outer circumferential surface around which a belt is placed, and an inner circumferential surface that is fitted around the outer circumferential surface of the outer ring.

At least one locking groove is provided around part in the axial direction of the outer circumferential surface of the outer ring, the locking groove having a width that is within the range of 1/20 to 1/2 the width of the outer ring; and knurling is formed on the bottom surface of this locking groove by a knurling process such that concave sections and convex sections that extend in the width direction and in an inclined state with respect to the axial direction are alternately arranged around the entire circumference; each of these concave sections comprising a bottom surface and two inside surfaces on both sides in the circumferential direction of the bottom surface and that are continuous with the tip end surfaces of the adjacent convex sections; these concave sections having a trapezoidal shape. Furthermore, a plurality of trapezoidal shaped protrusions that extend in the width direction and in an inclined state with respect to the axial direction and that engage with the concave sections are formed in part in the axial direction of the inner circumferential surface of the pulley.

Preferably in this aspect as well, the pulley is fastened to the outer circumferential surface of the outer ring by injection molding, and the protrusions are formed at the same time as this injection molding by molten resin of the pulley being filled in the locking groove and hardening.

Preferably, locking grooves are formed in two locations in the axial direction of the outer circumferential surface of the outer ring; and the concave sections and convex sections of the knurling that is formed in the bottom surfaces of these locking grooves are provided in a state so as to incline at the same angle with respect to the axial direction in opposite directions from each other.

It is also possible to apply the construction of the second aspect to the construction of the first aspect. Moreover, it is also possible to apply the conditions for the number, shape and dimensions of the concave sections and the convex section of the first aspect to the construction of the second aspect.

Effect of the Invention

In the case of the pulley apparatus of the present invention, by properly regulating the number, shape and dimensions of the concave sections and convex sections of knurling that is formed around the outer circumferential surface of the outer ring, it is possible to definitely prevent the occurrence of creep between the pulley made of synthetic resin and the outer ring made of a metal material.

Moreover, in a preferred embodiment of the present invention, it is possible to keep the force that is applied to the areas of contact between the surfaces on the sides in the circumferential direction of protrusions that are formed around the inner circumferential surface of the pulley and the inside surfaces of the knurling due to the rotation of the pulley small.

BRIEF DESCRIPTION OF THE DRAWINGS

FIG. 10A is a partial cross-sectional view of a rolling bearing, and FIG. 10B is a side view of a rolling bearing with part omitted.

MODES FOR CARRYING OUT THE INVENTION

Example 1

Figure 1:
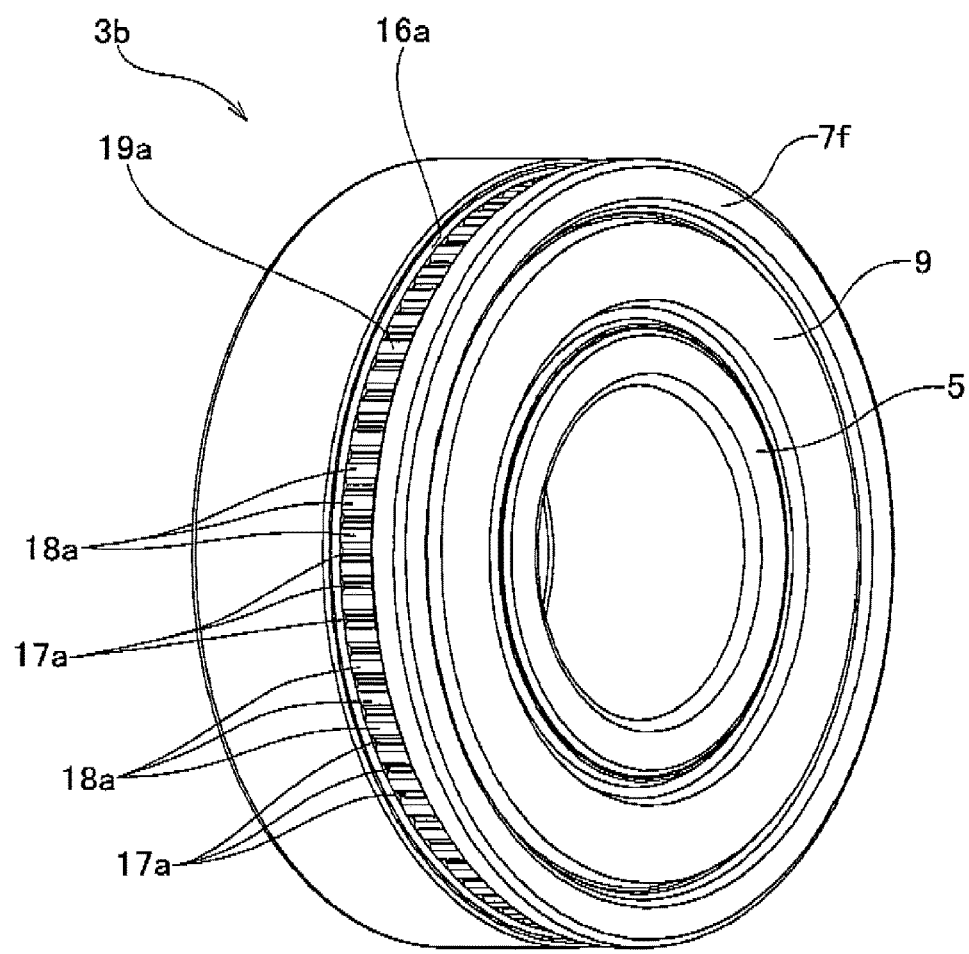
FIG. 1 is a perspective view illustrating a rolling bearing that has been removed from a pulley apparatus of a first example of an embodiment of the present invention.
Figure 2:
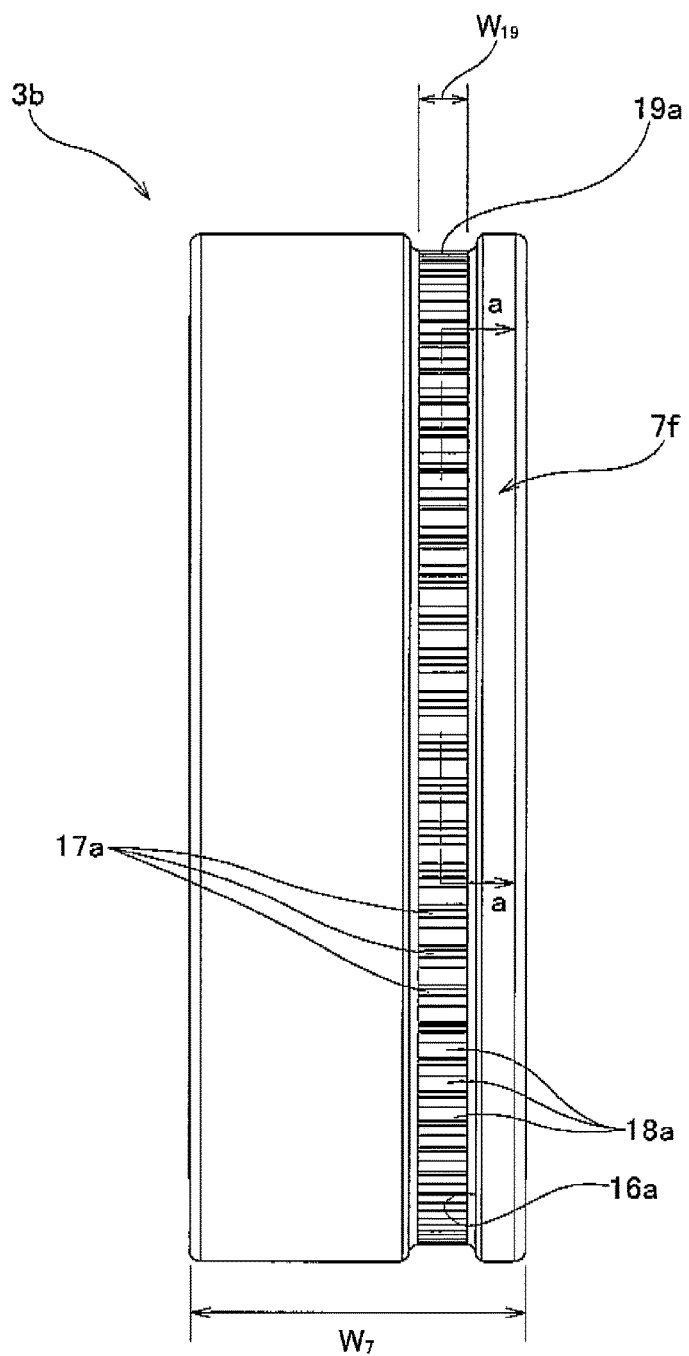
FIG. 2 is a front view as seen from the radial direction of the rolling bearing in FIG. 1.
Figure 3:
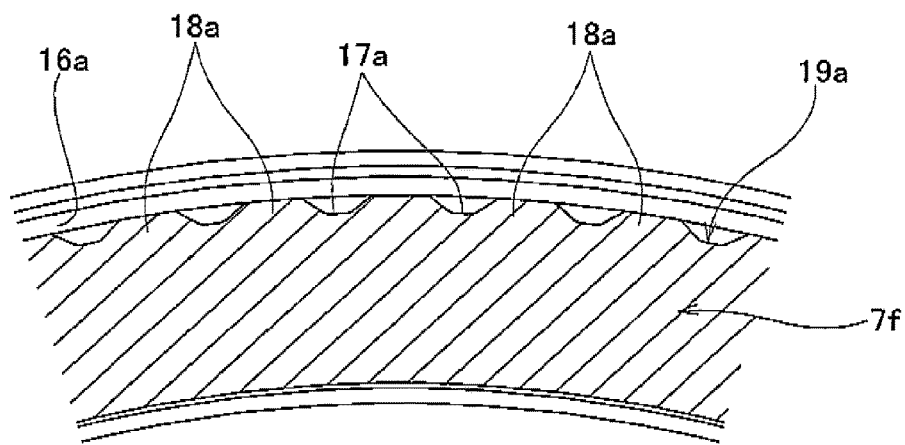
FIG. 3 is a partial cross-sectional view of section a-a in FIG. 2.
Figure 4:
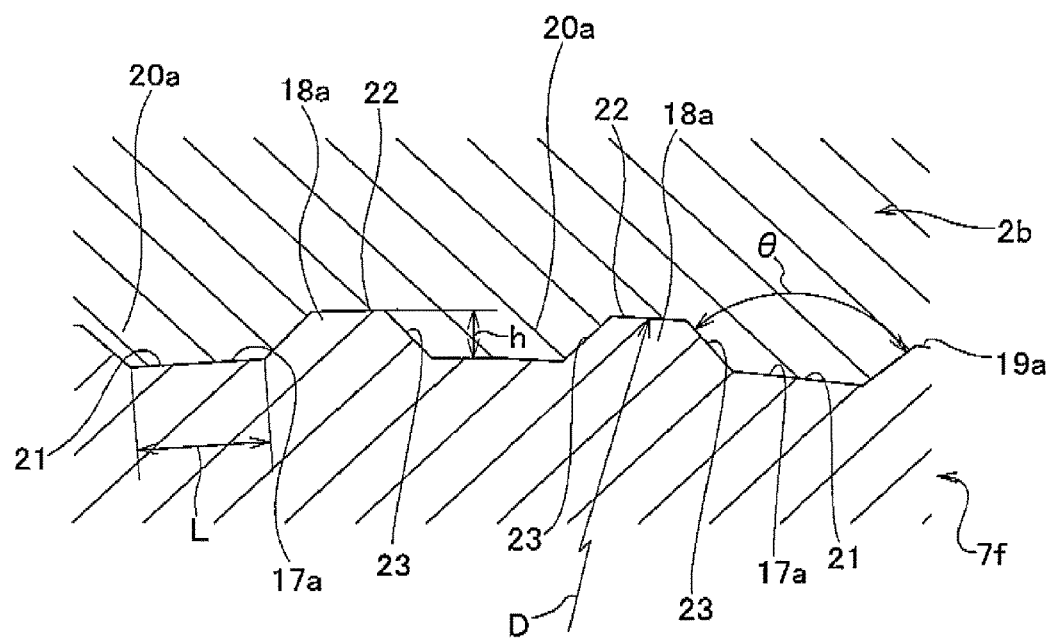
FIG. 4 is a drawing similar to FIG. 3 of a pulley apparatus of the first example of an embodiment of the present invention, and illustrates the state of a pulley fastened around the outer-diameter side of the outer ring.

FIG. 1 to FIG. 3 illustrate a first example of an embodiment of the present invention. A feature of this example is the devising of the shape and dimensions of concave sections 17a and convex sections 18a of knurling 19a that is formed on part of the outer circumferential surface of the outer ring of a pulley apparatus that certainly prevents the occurrence of creep between the pulley and outer ring. The construction and functions of the other parts are the same as in a conventional pulley apparatus, so drawings and explanations of identical parts are omitted or simplified, with the explanation below centering on the features of this example.

The outer ring 7f of the rolling bearing 3b of the pulley apparatus of this example has an outer diameter of 35 mm to 60 mm, a width dimension of 8 mm to 20 mm, and a locking groove 16a is formed around part in the axial direction of the outer circumferential surface. Concave sections 17a and convex sections 18a are formed on the bottom surface of this locking groove 16a so as to be alternately arranged around the entire circumference to form knurling 19a. By filling part of synthetic resin of the pulley 2b into the concave sections 17a and allowing the synthetic resin to solidify, protrusions 20a that are long in the axial direction are formed in part in the axial direction of the inner circumferential surface of the pulley 2b. By the protrusion 20a engaging with the knurling 19a, the occurrence of creep between the pulley 2b and the outer ring 7f is prevented. The width $W_{19}$ of the knurling 19a, and the width $W_7$ of the outer ring 7f are set so as to be regulated by the relationship $0.05W_7 \leq W_{19} \leq 0.5W_7$. When $W_{19}<0.05W_7$, there is a possibility that the creep torque that is applied between the pulley 2b and the outer ring 7f will not be able to be supported, which is undesirable. On the other hand, when $W_{19}>0.5W_7$, it becomes difficult to form the knurling 19a using knurling process.

The total number of concave sections 17a is taken to be 50 to 150. When the number of concave sections 17a, or in other words, the number of protrusions 20a is less than 50, the number of protrusions 20a becomes insufficient, and there is a possibility that creep torque that is applied between the pulley 2b and the outer ring 7f will not be able to be supported. On the other hand, when the number of concave sections 17a exceeds 150, there is a possibility that when trying to cause part of the synthetic resin of the pulley 2b to penetrate, the synthetic resin will not spread out completely in all of the concave sections 17a, and thus there is a possibility that gaps will occur between the bottom surfaces 21 of the concave sections 17a and the tip end surfaces of the protrusions 20a. Moreover, the length in the circumferential direction of the protrusions 20a becomes short, and the strength of the protrusions 20a will becomes low, so there is a possibility that creep torque that is applied between the pulley 2b and the outer ring 7f will not be able to be supported, and that durability of the pulley will not be able to be maintained.

Moreover, inside surfaces (stepped surfaces) 23 that are continuous with the tip end surfaces 22 of the convex sections 18a and that face each other in the circumferential direction are provided on the inner surfaces of the concave sections 17a, and the angle of intersection θ between adjacent inside surfaces 23 is regulated within the range of 45° to 120°. When the angle of intersection θ is less than 45°, there is a possibility that when trying to cause part of the synthetic resin of the pulley 2b to penetrate, the synthetic resin will not spread out completely in all of the concave sections 17a, and thus there is a possibility that gaps will occur between the bottom surfaces 21 of the concave sections 17a and the tip end surfaces of the protrusions 20a. On the other hand, when the angle of intersection θ exceeds 120°, not only does it become difficult to sufficiently maintain the number of concave sections 17a, but the pressure angle at the contact surface between the inside surfaces 23 and the protrusions becomes small. Therefore, it becomes easy for the inner circumferential surface of the pulley 2b to slide with respect to the outer circumferential surface of the outer ring 7f, and thus it is not possible to sufficiently obtain the effect of preventing creep.

In addition, when the depth h in the radial direction of the concave sections 17a, and the diameter D of the circumscribed circle of the tip end surface of the convex sections 18a (diameter at the peak of the convex sections 18a) are set so as to satisfy the relationship $0.004D \leq h \leq 0.015D$. When $h>0.015D$, there is a possibility that when trying to cause part of the synthetic resin of the pulley 2b to penetrate, the synthetic resin will not spread out completely in all of the concave sections 17a, and thus there is a possibility that gaps will occur between the bottom surfaces 21 of the concave sections 17a and the tip end surfaces of the protrusions 20a. On the other hand, when $h<0.004D$, it is not possible to sufficiently maintain connecting strength between the concave sections 17a and the protrusions 20a, and thus there is a possibility that creep torque that is applied between the pulley 2b and the outer ring 7f will not be able to be supported.

Furthermore, the length L in the circumferential direction of the bottom surface 21 of the concave sections 17a, and the diameter D of the circumscribed circle of the tip end surface 22 of the convex sections 18a are set so as to satisfy the relationship $0.01D \leq L \leq 0.03D$. When $L<0.01D$, it becomes difficult to sufficiently maintain the strength of the protrusions 20a, and thus there is a possibility that the torque applied between the pulley 2b and the outer ring 7f will not be able to be supported. On the other hand, when $L>0.03D$, it becomes difficult to sufficiently maintain the number of concave sections 17a.

Example 2

Figure 5:
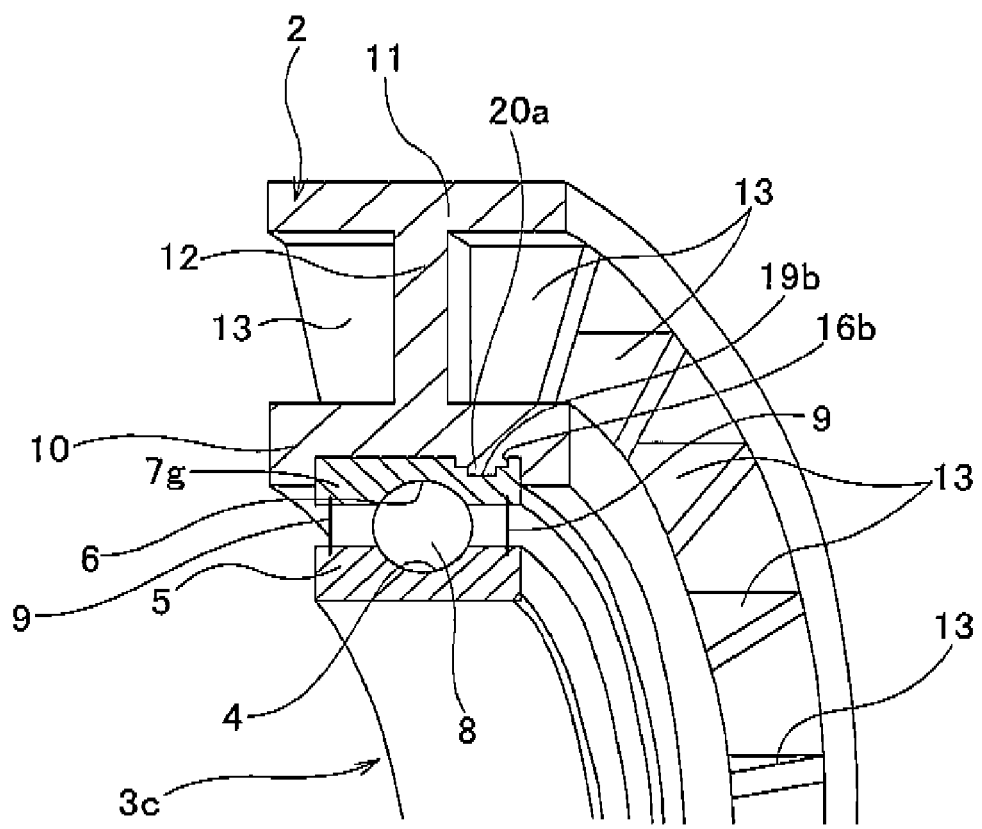
FIG. 5 illustrates a second example of an embodiment of the present invention, and is a partial cross-sectional perspective view of a pulley apparatus.
Figure 6:
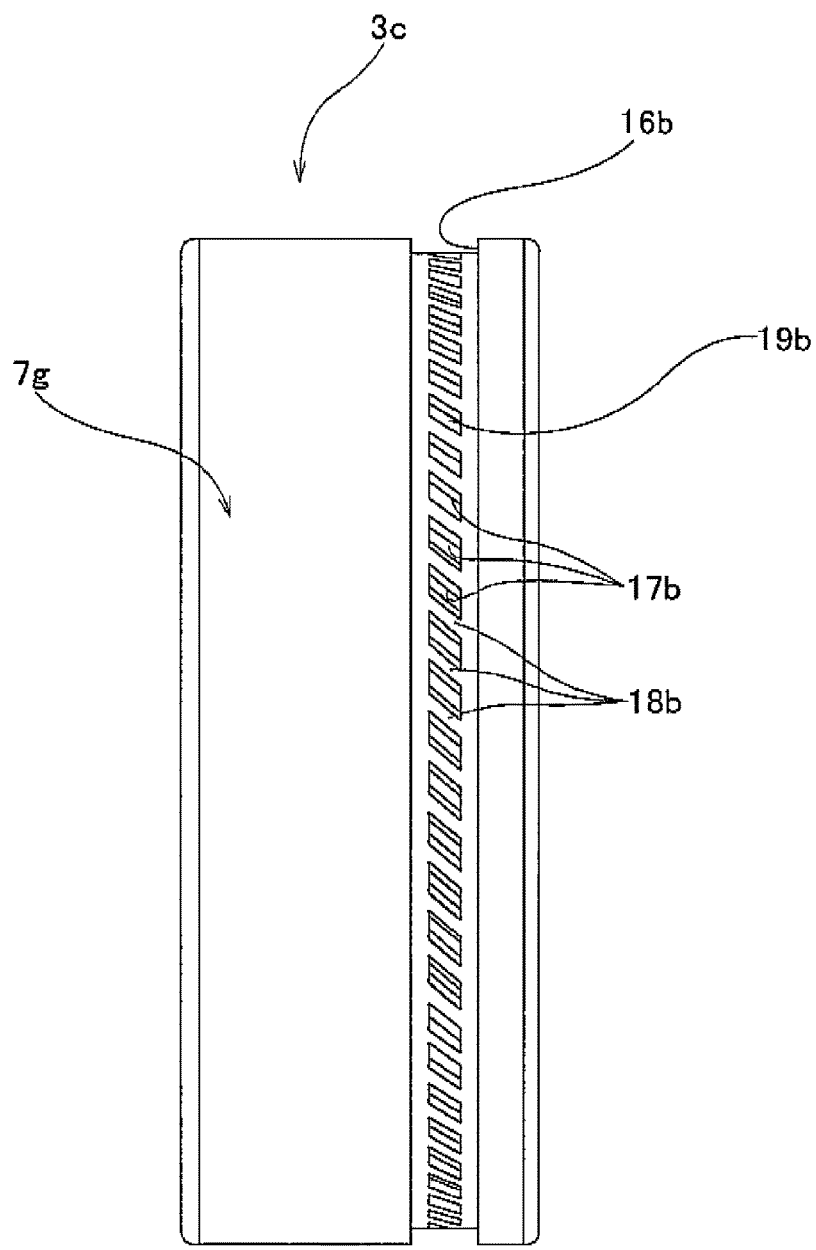
FIG. 6 is a front view as seen from the radial direction of a rolling bearing of a pulley apparatus of the second example of an embodiment of the present invention.

FIG. 5 and FIG. 6 illustrate a second example of an embodiment of the present invention. In this example, concave sections 17b and convex sections 18b of knurling 19b are provided in an inclined state with respect to the axial direction of a rolling bearing 3c. This kind of knurling 19b can be formed by performing knurling on the bottoms surface of a locking groove 16b by a twill knurling tool. As in the first example of the embodiment, part of the synthetic resin of the pulley 2c penetrates into the concave sections 17b and solidifies to form protrusions 20b on the inner circumferential surface of the pulley 2c that are inclined with respect to the axial direction. The protrusions 20b engage with the knurling 19b on the outer ring, which prevents the occurrence of creep between the pulley 2c and the outer ring 7g.

In this example, the concave sections 17b and convex sections 18b are provided in a state so as to be inclined with the axial direction of the rolling bearing 3c, so as the pulley 2c rotates, it is possible to reduce the force that is applied to the stepped surface of the knurling 19b from the side surfaces in the circumferential direction of the protrusions 20b. The angle (twist angle) a that is formed between the formation direction of the concave sections 17b and the convex sections 18b and the axial direction of the rolling bearing 3b is regulated within the range 0°<α≤10°, and preferably within the range 0°<α≤3°. The lower limit value of the range for the twist angle α is set from the aspect of keeping the force applied to the inside surface (stepped surface) of the concave sections 17b from the side surfaces in the circumferential direction of the protrusions small. On the other hand, the upper limit value of the range for the twist angle α is set from the aspect of preventing the force in the tangential direction with respect to the engaging section between the side surfaces in the circumferential direction of the protrusions 20b and the inside surfaces of the concave sections 17b from becoming too large.

An axial load that occurs in the outer ring 7f as the pulley 2c rotates is supported by the engagement between the end surfaces in the width direction of the protrusions 20b and the inside end surfaces in the width direction of the concave sections 17b. In this example, the inside end surfaces in the width direction of the concave sections 17b are provided in a perpendicular direction with respect to the axial direction of the outer ring 7f. However, it is also possible to form the concave sections 17b so as to span across the width direction of the locking groove 16b (in a state wherein both end sections in the width direction of the concave sections 17b are open on the surfaces of both sides in the width direction of the locking groove 16b), or it is possible to form the inside end surfaces in the width direction of the concave sections 17b as a surface that is orthogonal with respect to the formation direction of the concave sections 17b and convex sections 18b. The construction and effect of the other parts are the same as in the first example of the embodiment. Preferably, in this example as well, the conditions related to the number, shape and dimensions of the concave sections and convex sections of the first example are applied.

Example 3

Figure 7:
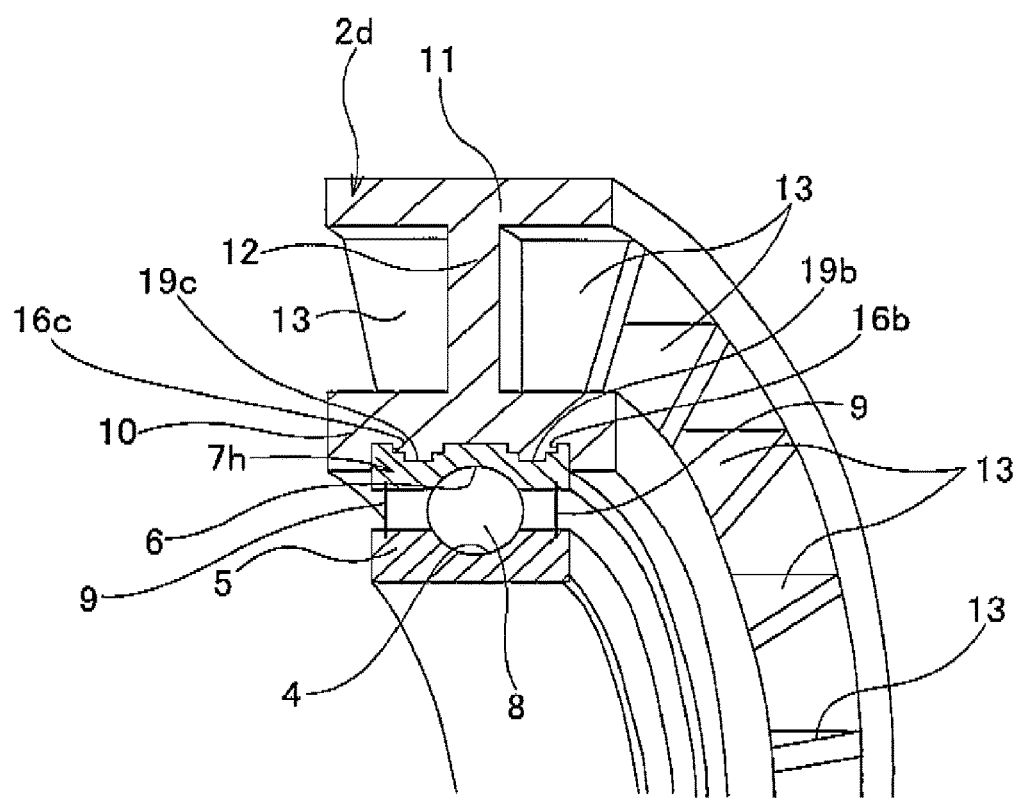
FIG. 7 illustrates a third example of an embodiment of the present invention, and is a partial cross-sectional perspective view of a pulley apparatus.
Figure 8:
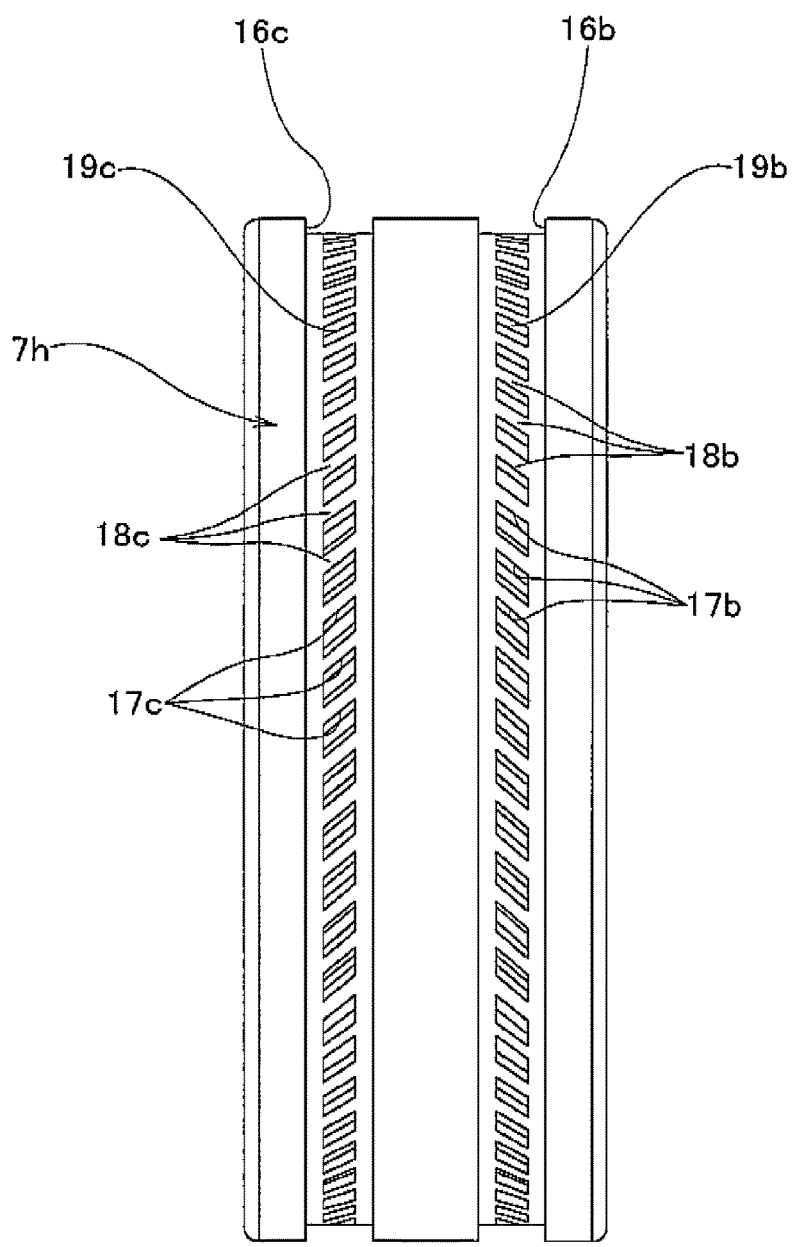
FIG. 8 is a front view as seen from the radial direction of a rolling bearing of a pulley apparatus of the third example of an embodiment of the present invention.
Figure 9:
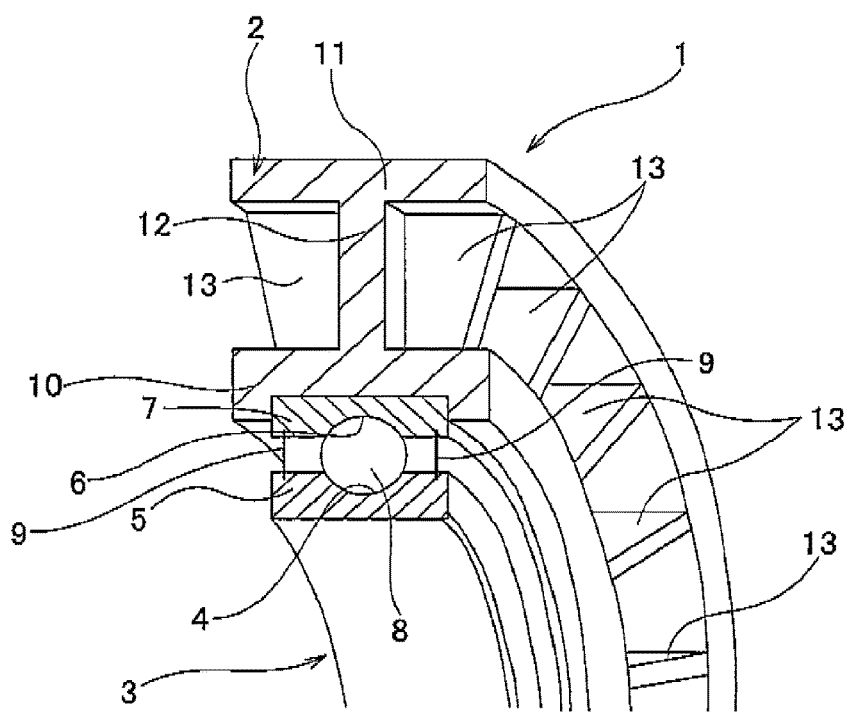
FIG. 9 is a partial cross-sectional perspective view illustrating an example of a conventional pulley apparatus.
Figure 10A:
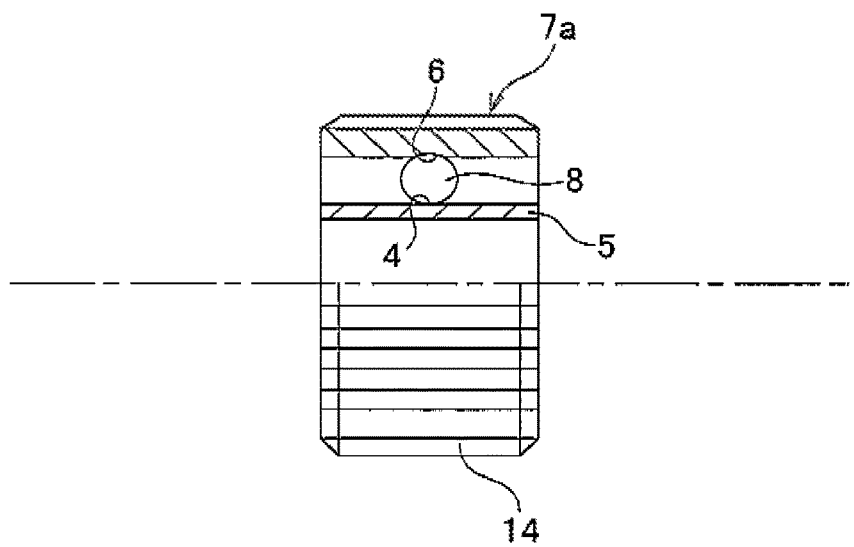
FIGS. 10A and 10B illustrate a first example of construction for preventing creep in a conventional pulley apparatus, where
Figure 10B:
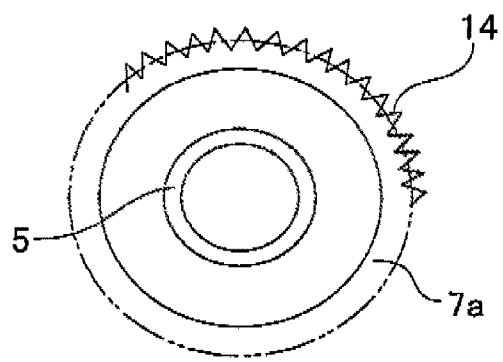
Figure 11A:
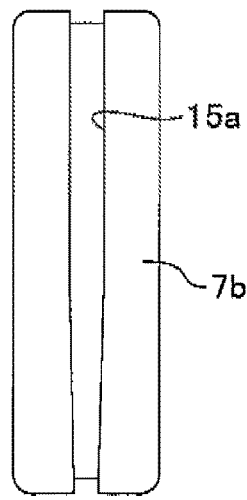
FIG. 11A illustrates a second example and FIG. 11B illustrates a third example of construction for preventing creep in a conventional pulley apparatus.
Figure 11B:
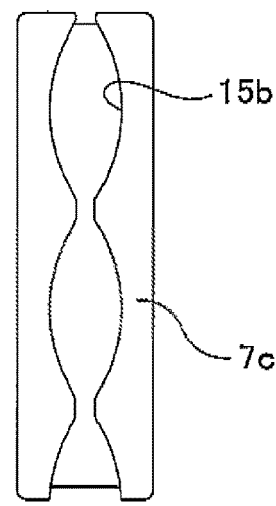
Figure 12:
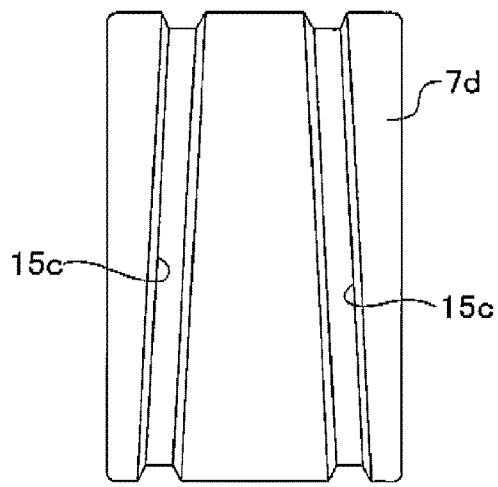
FIG. 12 illustrates a fourth example of construction for preventing creep in a conventional pulley apparatus, and is a front view of a rolling bearing as seen from the outside in the radial direction.
Figure 13:
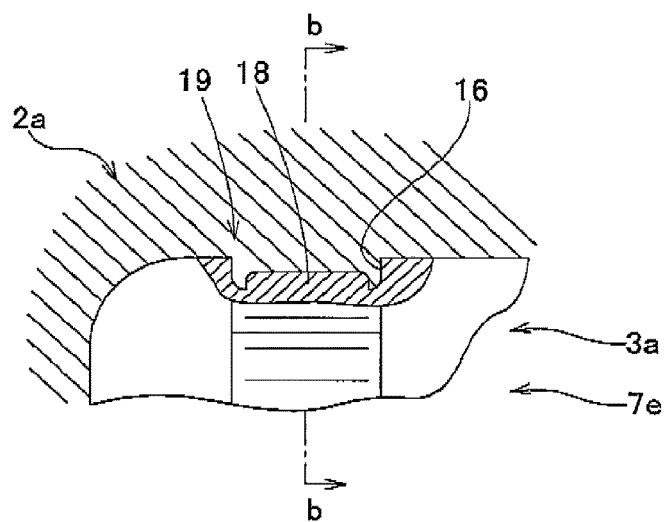
FIG. 13 is a partial cross-sectional view that illustrates a fifth example of construction for preventing creep in a conventional pulley apparatus.
Figure 14:
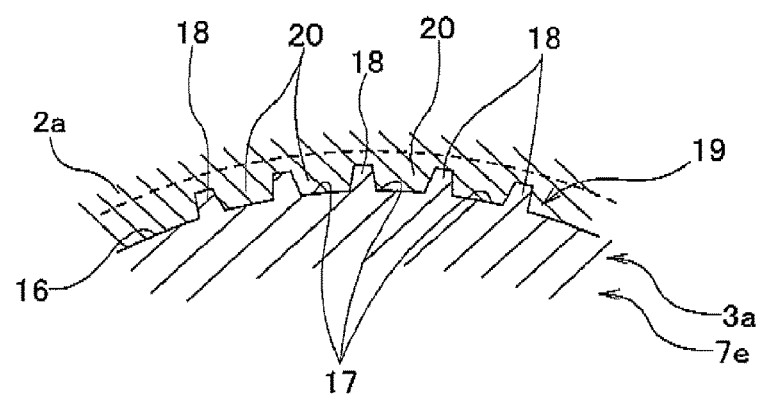
FIG. 14 is a cross-sectional view of section b-b in FIG. 13.

FIG. 7 and FIG. 8 illustrate a third example of an embodiment of the present invention. In this example, knurling 19b, 19c is formed at two locations around the outer circumferential surface of the outer ring 7h so as to be symmetrical about the center section in the axial direction of the outer ring 7h. In other words, locking grooves 16b, 16c are formed at two locations around the outer circumferential surface of the outer ring 7h that are separated in the axial direction, and concave sections 17b, 17c and convex sections 18b, 18c of the knurling 19b, 19c are formed in the bottom surfaces of the locking grooves 16b, 16c so as to be inclined at the same angle in opposite directions in the axial direction. However, the period (pitch) of the concave sections 17b, 17c and convex sections 18b, 18c do not necessarily need to be the same, and, for example, the period of the knurling 19c could be shifted by half a period with respect to the period of the knurling 19b.

In this example, the knurling 19b, 19c are formed at two locations on the outer circumferential surface of the outer ring 7h so as to be symmetrical about the center section in the axial direction of the outer ring 7h. Therefore, the axial loads that occur in the outer ring 7h as the pulley 2d rotates can cancel each other out. The construction and effect of the other parts are the same as in the second example of the embodiment.

Specific Example

Testing that was performed to confirm the effect of the invention related to the first example of the embodiment above will be explained. In this testing, a total of two kinds of samples of single-row deep-groove ball bearings, having JIS bearing number 6203, with an inner diameter of 17 mm, outer diameter of 40 mm and width of 12 mm, were formed such that one kind of sample (example of the invention) that is within the technical scope of the present invention, and the other kind of sample (comparative example) is not within the scope of the present invention, and were such that the number, shape and dimensions of concave sections and convex sections of the formed knurling differed between each kind of sample. In each kind of sample, the width dimension of the locking groove was 2.4 mm and the width dimension of the knurling of both was 1.6 mm.

TABLE 1

| | Number of Concave Sections | Intersection Angle θ (degrees) | Depth h of Concave Sections (mm) | Diameter D of Circumscribed Circle of Tip End Surface of Convex Sections (mm) | Length L in Circumferential Direction of Bottom Surface of Concave Sections (mm) |
|---|---|---|---|---|---|
| Example | 76 | 95 | 0.3 | 38 | 1.6 |
| Comparative Example | 200 | 80 | 0.2 | 39 | 0.6 |

In each of the examples illustrated in Table 1, the pulley apparatuses are such that synthetic resin is injected into each of the outer ring to form pulleys around the outer circumferential surface of the outer rings. The synthetic resin material used for the pulleys was nylon 66, the outer diameter dimension of the pulleys was 70 mm, and the width dimension was 24 mm.

In the pulley apparatuses that were obtained in this way, pulleys were fastened so as not to be able to rotate and a force in the rotation direction was applied to the outer ring. In this state, the size of the torque when creep (relative rotation of the outer ring with respect to the pulley) occurred between the pulley and the outer ring was measured three times.

TABLE 2

| | Size of Torque when Creep Occurred (Nm) | | | |
|---|---|---|---|---|
| | First Try | Second Try | Third Try | Average |
| Example | 111 | 92 | 110 | 104.3 |
| Comparative Example | 120 | 85 | 86 | 97 |

Table 2 illustrates the results of the test. The standard deviation of the size of the torque when creep occurred was suppressed at 8.7 for the example, which was about half of the 16.3 for the comparative example. This shows that there are cases when the number, shape and dimension of the knurling was not suitably regulated, gaps occurred between the bottom surfaces of the concave sections of the knurling and the tip end surfaces of the protrusions, and that it is not possible to sufficiently maintain the connecting strength between the pulley and the outer ring. Moreover, it can be seen that for the average value of the size of the torque when creep occurred, there was about a 10% improvement in the case of the example of the invention when compared with the comparison example. From the testing above, it could be confirmed that there was definitely an improvement in the size of the creep torque that could be supported between the pulley and the outer ring by applying the present invention to the pulley apparatus having construction, for example, as disclosed in JP 11-148550 (A).

EXPLANATION OF REFERENCE NUMBERS

1 Pulley apparatus
2, 2a to 2d Pulley
3, 3a to 3c Rolling bearing
4 Inner ring raceway
5 Inner ring
6 Outer ring raceway
7, 7a to 7h Outer ring
8 Rolling body
9 Seal plate
10 Inner-diameter side cylindrical section
11 Outer-diameter side cylindrical section
12 Connecting section
13 Reinforcement rib
14 Knurling
15a to 15c Concave groove
16, 16a to 16c Locking groove
17, 17a to 17c Concave section
18, 18a to 18c Convex section
19, 19a to 19c Knurling
20, 20a, 20b Protrusion
21 Bottom surface
22 Tip end surface
23 Inside surface

What is claimed is:

1. A pulley apparatus, comprising:
a rolling contact bearing including an outer ring having an outer circumferential surface and an inner ring, the outer and inner rings carrying respective outer and inner raceways confining a plurality of rolling elements; and a pulley having an outer circumferential surface for engaging a drive belt, and an inner circumferential surface that engages the outer circumferential surface of the outer ring;

wherein:

the outer circumferential surface of the outer ring has at least one circumferential locking groove having a bottom surface at a predetermined depth and lateral, radially extending planar walls defining a locking groove axial width within a range of $\frac{1}{20}$ to $\frac{1}{2}$ of an axial width of the outer ring;

a circumferential series of concavities are formed at intervals along the entire bottom surface of the at least one locking groove, such that portions of the bottom surface of the at least one locking groove are retained between adjacent concavities;

each concavity has trapezoidal radially inwardly tapering cross-section in a radial plane, is axially bounded by radial planar walls spaced axially inwardly from the respective lateral walls of the at least one locking groove, and is bounded circumferentially by planar walls intersecting adjacent portions of the bottom surface of the at least one locking groove; and the inner circumferential surface of the pulley has complementary trapezoidal projections that engage the concavities.

2. The pulley apparatus of claim 1, wherein the planar walls circumferentially bounding the concavities intersect the adjacent portions of the bottom surface of the at least one locking groove along axially parallel lines.

3. The pulley apparatus of claim 2, wherein the radial planar walls bounding each concavity are equally spaced from the respective lateral walls of the at least one locking groove.

4. The pulley apparatus of claim 1, wherein the radial planar walls bounding each concavity are equally spaced from the respective lateral walls of the at least one locking groove.

5. The pulley apparatus of claim 1, wherein the pulley is fastened to the outer circumferential surface of the outer ring by injection molding, and the protrusions are formed at the same time as the injection molding by molten resin of the pulley being filled in the at least one locking groove and hardening.

* * * * *